(12) United States Patent
Tsuchida

(10) Patent No.: US 7,426,344 B2
(45) Date of Patent: Sep. 16, 2008

(54) ELECTRONIC APPARATUS PROVIDED WITH A ROTATING-OPERATION MEMBER AND THE ROTATING-OPERATION MEMBER

(75) Inventor: Naohiro Tsuchida, Hachioji (JP)

(73) Assignee: Olympus Corporation, Tokyo (JP)

( * ) Notice: Subject to any disclaimer, the term of this patent is extended or adjusted under 35 U.S.C. 154(b) by 452 days.

(21) Appl. No.: 11/209,934

(22) Filed: Aug. 23, 2005

(65) Prior Publication Data

US 2006/0062565 A1    Mar. 23, 2006

(30) Foreign Application Priority Data

Sep. 17, 2004    (JP)    ............... 2004-270641

(51) Int. Cl.
*G03B 17/10* (2006.01)
(52) U.S. Cl. .................. 396/299; 396/297; 396/281; D10/122; D10/123
(58) Field of Classification Search .............. D10/123, D10/122; 177/27; 396/297, 299
See application file for complete search history.

(56) References Cited

U.S. PATENT DOCUMENTS 3,058,075 A * 10/1962 Polley .......................... 334/51
3,249,300 A * 5/1966 Van Buskirk ......... 235/144 HC
3,996,880 A * 12/1976 Cauldwell .................. 116/296
4,176,936 A * 12/1979 Kozuki et al. ............... 396/245
5,485,238 A * 1/1996 Miura et al. ................. 396/281

FOREIGN PATENT DOCUMENTS

JP    2001-215546    8/2001

* cited by examiner

*Primary Examiner*—W. B. Perkey
*Assistant Examiner*—Michael A Strieb
(74) *Attorney, Agent, or Firm*—Straub and Pokotylo; John C. Pokotylo

(57) ABSTRACT

An electronic apparatus provided with a plurality of rotating-operation members, in which respective disk sections of the plurality of rotating-operation members are arranged to be at least partially overlapped, to thereby enable it to achieve space-saving. As the electronic apparatus capable of achieving the space-saving, there is included a film camera, a digital camera, and a video camera, that is an image pick-up device. Rotational axes extended from respective disk sections may be parallel coaxial or parallel non-coaxial, or may be inclined to each other. Additionally, in order to prevent surfaces from being scratched or damaged by mutual contact between the disk sections, a protrusion may be provided.

6 Claims, 3 Drawing Sheets

ELECTRONIC APPARATUS PROVIDED WITH A ROTATING-OPERATION MEMBER AND THE ROTATING-OPERATION MEMBER

CROSS-REFERENCE TO THE RELATED APPLICATION

This application is based upon and claims the benefit of priority from prior Japanese Patent Application No. 2004-270641, filed on Sep. 17, 2004, the entire contents of which is incorporated herein by reference.

BACKGROUND OF THE INVENTION

1. Field of the Invention

The present invention relates to an electronic apparatus having rotating-operation members, which are manually rotationally operated, and to the rotating-operation members.

2. Description of the Related Art

An electronic apparatus including an image pickup device, such as a film-based camera, a digital camera, and a video camera, is often provided with a rotating-operation member which is manually operated. The rotating-operation member is mostly formed in a disk-like shape, and also there are many cases where one electronic apparatus contains therein a plurality of rotating-operation members.

Normally, an outer peripheral side face of the rotating-operation member is subjected to antiskid processing such as knurl processing. The rotating-operation member is generally constructed such that when an operator manually rotates the rotating-operation member to a desired position, a switch corresponding to that desired position is turned on. For example, a digital camera, which is one of the electronic appliances, is typically provided with two rotating-operation members called a mode dial and a shift dial on its top face. The operator rotates the mode dial to select a photography mode (a portrait mode, a close-up mode, a sport mode, a night view mode, a scenery mode, a moving object mode, or the like), an exposure control mode (a program Auto Exposure mode "P", an aperture priority Auto Exposure mode "AV", a shutter speed priority Auto Exposure mode "TV", a manual Auto Exposure mode "M"), or the like. The operator also rotates the shift dial to select a numerical value relating to an exposure with respect to the selected modes.

BRIEF SUMMARY OF THE INVENTION

The present invention aims to achieve saving of space, in an electronic apparatus provided with a plurality of rotating-operation members, through such a disposition that disk sections of the respective rotating-operation members are at least partially overlapped with each other. As the electronic apparatus, which should suitably achieve the space-saving, there are a film camera, a digital camera, and a video camera, which is an image pick-up device, respectively. But the scope of the invention is not limited to these devices.

Rotational axes extended from respective disk sections may be disposed to be coaxial or parallel, or may be inclined relative to each other.

When the axes are of coaxial axes, the disk element of one rotating-operation member is superposed on the disk element of the other rotating-operation member. In this case, when an outer diameter of an upper disk element is smaller than that of a lower disk element, rotating operation of both rotating-operation members can be facilitated. However, when the outer diameters of the upper disk element and the lower disk element are the same, reduction in more space in a longitudinal or vertical direction can be achieved. Meanwhile, when the outer diameter of the lower disk element is smaller than that of the upper disk element, the upper disk element will exhibit good operability. Hence, the rotating-operation member that will not be frequently operated may preferably be arranged at a lower side, under a condition such that the outer diameter of the disk element of the lower side member is made smaller than that of the other disk element of the upper side member.

A common use of a single circuit board with respective switch sections of the two rotating-operation members can increase space-saving efficiency. In this case, a switch contact of one of the rotating-operation members will be brought into contact with the top face of the circuit board, and a switch contact of the other of the rotating operation members will be brought into contact with the bottom face of the circuit board.

When the axes take a parallel disposition, the respective disk sections of a plurality of rotating-operation members are constructed to have different heights, respectively, and arranged so that a portion of one disk element is overlapped with the other disk element. The partial overlapping of the disk sections will provide excellent space-saving efficiency in the exterior configuration of the electronic apparatus. Meanwhile, with regard to the switch sections of the two rotating-operation members, since the area occupied by these sections is less than that occupied by the respective disk sections, it is advantageous from the viewpoint of the layout of the parts when they are provided substantially on the same height.

When the rotational axes are inclined relative to each other, since the switch sections may be arranged to be spaced apart from each other, an advantage can be acquired from the view point of manufacturing.

In addition to the foregoing, a protrusion may be provided so as to prevent the surfaces of the disk sections from being scratched or damaged by mutual contact with the other disk sections. Then, the protrusion is preferably formed in a ring-shape.

According to the present invention, when a plurality of rotating-operation members are arranged on an electronic appliance, at least parts of disk sections of respective rotating-operation members are arranged so as to be overlapped, thereby achieving space reduction.

BRIEF DESCRIPTION OF THE SEVERAL VIEWS OF THE DRAWINGS

These and other features, aspects, and advantages of the apparatus and methods of the present invention will become better understood from the ensuing description, appended claims, and accompanying drawings wherein:

DETAILED DESCRIPTION OF THE PREFERRED EMBODIMENTS

Preferred embodiments of the invention are described hereinbelow with reference to the accompanying drawings.

Figure 1:
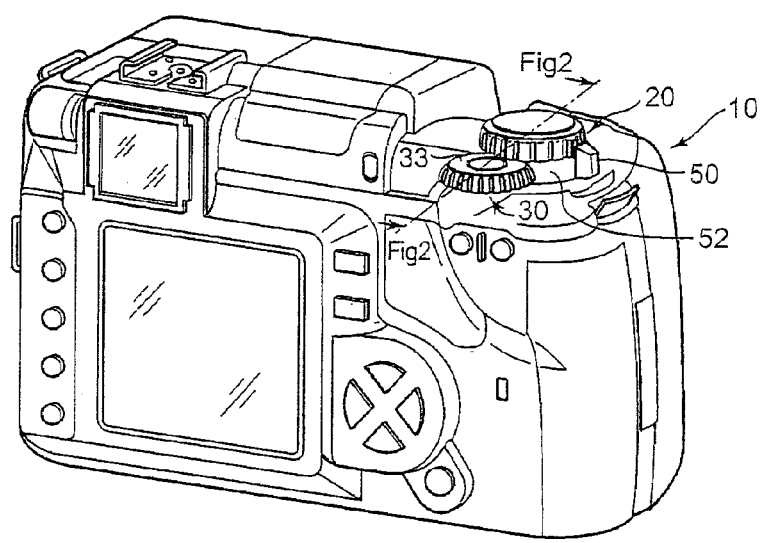
FIG. 1 is a perspective view of a first embodiment according to the present invention when applied to an image pick-up device (specifically digital camera) as an electronic appliance.
Figure 2:
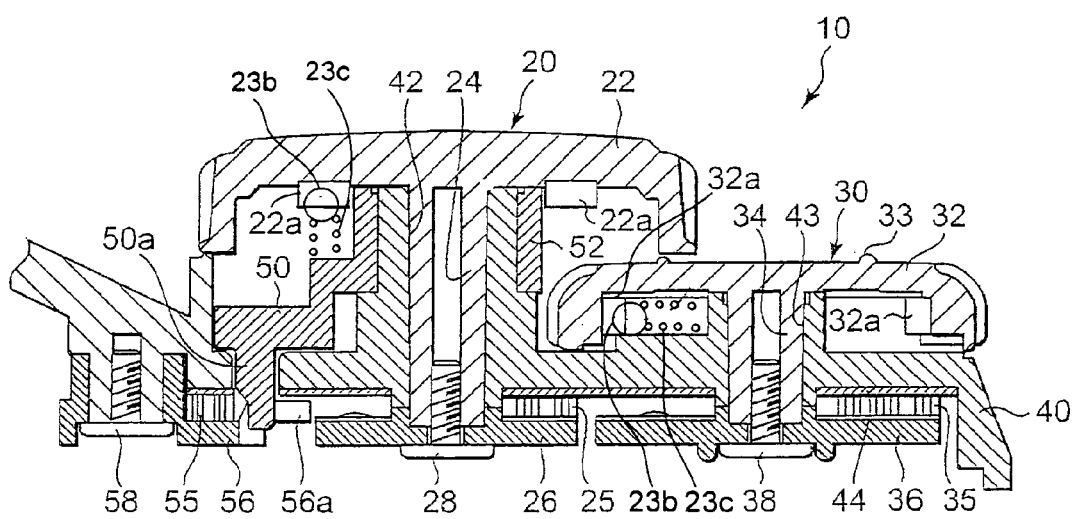
FIG. 2 is a longitudinal cross-sectional view, in part cutaway, taken along the line in FIG. 1.

Hereinafter, referring to the drawings, a first embodiment of the present invention will be explained. FIG. 1 shows a back perspective view of an image pick-up device (specifically, digital camera) as an electronic apparatus to which the present invention is applied, and FIG. 2 shows a longitudinal sectional view of a partially cutaway section along a cutting-plane line in FIG. 1.

As shown in FIG. 1, a digital camera (an electronic appliance, an image pick-up device) 10 is provided on a top face with two rotating-operation members 20 and 30 for being manually rotated. As shown in FIG. 2, a first and a second rotating-operation members 20 and 30, which are integrally formed by molding together with rotational shafts from a synthetic resin or the like, includes disk sections 22 and 32, and their rotational shafts 24 and 34. Moreover, outer peripheral surfaces of the disk sections 22 and 32 are knurled for antiskid purpose. It is not essential to integrally form the disk sections 22 and 32 with the rotational shafts 24 and 34, respectively, but alternatively, against integral formation, a rotational shaft formed as a separate element may be fit to a fitting hole of the disk section, so that the disk section and the rotational shaft may be integrated as one part.

According to the first embodiment of the present invention, the first rotating-operation member 20 and the second rotating-operation member 30 will be defined as a mode dial and a shift dial, respectively. An operator may rotate the mode dial 20 to select a photography mode (a portrait mode, a close-up mode, a sport mode, a night view mode, a scenery mode, a moving object mode, or the like), an exposure control mode (a program Auto Exposure mode, an aperture priority Auto Exposure mode, a shutter speed priority Auto Exposure, a manual Auto Exposure mode), or the like. The operator may also rotate the shift dial 30 to select a desired numerical value in relation to an exposure in respective modes selected by the mode dial 20.

A plurality of click holes 22a are formed to be spaced apart from each other by a predetermined angle in a circumferential direction in an inner surface of the disk section 22. A steel ball 23b is engaged in the respective click holes 22a from the bottom with an elastic force exerted by a compression coil spring 23c arranged perpendicularly. Hence, a rotational position of the mode dial 20 is determined and the photography mode (portrait) or the like is selected. Similarly, a plurality of click holes 32a are formed to be spaced apart from each other by a predetermined angle in the circumferential direction in an inner surface of the disk section 32. A steel ball 23b is engaged in this click hole 32a from the side with an elastic force exerted by a compression coil spring 23c arranged horizontally. Thus, a numerical value in relation to the exposure or the like is selected, while providing intermittent click feeling during rotating of the shift dial 30.

According to the first embodiment of the present invention, the rotational shaft 24 of the mode dial 20 (first rotating-operation member) and the rotational shaft 34 of the shift dial 30 (second rotating-operation member) are arranged to be relatively displaced in a horizontal direction (non-coaxial). Meanwhile, the respective rotational shafts 24 and 34 are parallel to each other. Thus, the disk section 22 of the mode dial 20 and the disk section 32 of the shift dial 30 are partially overlapped, and arranged one above the other to be relatively displaced.

Shaft receipt holes 42 and 43 are formed in an upper covering 40 (fixing member) used as a base plate, to permit the rotational shafts 24 and 34 to be rotatably inserted therein, respectively. A contact stage 26 to which an electrical contact 25 for the mode dial 20 is integrally secured on the top surface thereof is fixed to the bottom of the rotational shaft 24 by a screw 28. In addition, a contact stage 36 to which an electrical contact 35 for the shift dial 30 is integrally secured on the top surface thereof is fixed to the bottom of the rotational shaft 34 by a screw 38.

Here, the disk sections 22 and 32, which are partially overlapped with each other, are arranged one above the other via a clearance gap left therebetween, and it is therefore designed so that the disk section 22 of the upper mode dial 20 may not be in contact with the top face of the disk section 32 of the lower shift dial 30 even when the disk section 22 of the upper mode dial 20 is rotated. However, the rotational shaft 24 of the mode dial 20 and the rotational shaft 34 of the shift dial 30 are rotatably inserted in the fitting holes 42 and 43 of the upper covering 40. Therefore, if there is a clearance gap between the shaft receipt holes 42 and 43, and the rotational shafts 24 and 34, or a play appears due to a production error between mutual parts, when the disk section 22 of the mode dial 20 is rotated, there might be a possibility that the disk section 22 of the mode dial 20 may come into contact with the top face of the disk section 32 of the lower shift dial 30 to thereby allow a contact trace to be left on the top face of the disk section 32. Accordingly, a ring-like protrusion 33 is provided on the top face of the disk section 32 of the shift dial 30 in a position where physical contact might occur with the disk section 22 of the mode dial 20. According to this configuration, even when the disk section 22 of the mode dial 20 is rotated while keeping a contact with the disk section 32 of the lower shift dial 30 due to the play, the protrusion 33 operates as a receipt for the disk section 22. Therefore, any contact trace may not be produced on the top face of the disk section 32.

A flexible printed circuit board 44 common to the mode dial 20 and the shift dial 30 is provided above the electrical contact 25 for the mode dial and the electrical contact 35 for the shift dial, and under the upper covering 40. When the mode dial 20 and the shift dial 30 are rotated, the electrical contact 25 for the mode dial 20 and the electrical contact 35 for the shift dial 30 will come into contact with a plurality of radial electric contact patterns (terminals) provided on the flexible printed circuit board 44. Thus, a mode, called the photography modes such as the portrait mode or the like, and a numerical value in association with the desired exposure corresponding to the respective modes are selected.

As described above, the electrical contact 25 for the mode dial integral with the contact stage 26 constitutes a switch of the mode dial 20 with the common flexible board 44. The electrical contact 35 for the shift dial integral with the contact stage 36 also constitutes a switch of the shift dial 30 together with the common flexible printed circuit board 44.

According to the first embodiment of the present invention, the switches of the mode dial 20 and the shift dial 30 (the electrical contacts 25 and 35, the contact stages 26 and 36, and the flexible printed circuit board 44) are positioned on a substantially identical horizontal plane (on a flat plane), and are not displaced in a perpendicular direction (an axial direction of the shaft). Therefore, a space saving is achieved also in the axial direction of the shaft, resulting in reducing the entire size of the rotating-operation members.

As will be understood from above description, according to the first embodiment of the present invention, with the electronic appliance having a plurality of rotating-operation members, the disk sections which occupy a large area are arranged to have different heights while permitting both sections to be at least partially overlapped with one another. Moreover, the switch sections having areas less than those of the disk sections are arranged substantially on the same height without being overlapped with each other. Therefore, in the external appearance of the electronic appliance, the disk sections can take a compact arrangement. Furthermore, an arrangement of the other parts can be accomplished without being hindered by the switches.

Incidentally, reference numeral 50 designates a power switch lever, which is rotatably arranged coaxially with the mode dial 20. Reference numeral 52 designates a portion of the power switch lever 50. Since the power switch lever 50 is also rotated manually, it can be considered as a rotating-operation member (a third rotating-operation member). A contact stage 56, to which the electrical contact 55 for the power switch lever 50 is integrally secured on the top surface thereof, is rotatably held by the upper covering 40 by means of a screw 58. A pin 50a provided at an end of a rotatable outermost periphery of the power switch lever 50 is inserted in a fork-like notch 56a provided in the contact stage 56, so that the power switch lever 50 is engaged with the contact stage 56. Therefore, when the power switch lever 50 is rotated, the contact stage 56 is also rotated in association therewith. An electric terminal (electric contact pattern, on-off terminal) which may come in contact with the electrical contact 55 for the power switch lever 50 is provided on the flexible printed circuit board 44, and the electrical contact 55 for the power switch lever 50 integral with the contact stage 56 may be brought into contact with a corresponding terminal (the electric contact pattern) of the flexible printed circuit board 44 according to the rotation of the contact stage 56. Hence, the power switch is switched between on and off states.

According to the present first embodiment, the mode dial 20 and the shift dial 30 per se are arranged to be perpendicularly displaced, and the mode dial 20 is positioned above the shift dial 30 by an amount of the displacement, so that a space appears in a vertically axial direction (in the vertical direction). Additionally, as will be understood from FIG. 2, the power switch lever 50 is coaxially arranged under the mode dial 20 through the utilization of the space of this vertical direction. As a result, the above-mentioned space is effectively utilized, thereby making it possible to achieve further space-saving. If the power switch lever 50 were arranged without any cooperation with the mode dial 20, a large space would be required for the arrangement on a horizontally extending plane. According to the present first embodiment, the mode dial 20 and the shift dial 30 are arranged to be vertically displaced from one another, so that the required space in the vertically axial direction can be effectively utilized for the coaxial arrangement of the power switch lever 50.

According to the first embodiment, as shown in FIGS. 1 and 2, the rotational shafts 24 and 34 of the mode dial 20 (the first rotating-operation member) and the shift dial 30 (the second rotating-operation member) are arranged to be horizontally displaced, and the disk sections 22 and 24 thereof are partially overlapped while being vertically displaced one above the other. Therefore, in comparison with a case where the disk section 22 and 24 are arranged to be spaced apart in the horizontal direction without being overlapped with one another, only a small space may be required for the arrangement of the mode dial 20 and the shift dial 30 on a horizontally extending plane and accordingly, it is possible to achieve space-saving on the horizontally extending plane. Accordingly, when applying the present invention to the image pick-up device, such as a film-based camera, a digital camera, and a video camera, or the like, the image pick-up device can be of small size.

In the first embodiment described above, the rotational shafts 24 and 34 of the mode dial 20 (the first rotating-operation member) and the shift dial 30 (the second rotating-operation member) are arranged to be horizontally displaced, and the disk sections 22 and 24 thereof are partially overlapped and arranged to be vertically displaced one above the other. Alternatively, as shown in a second embodiment of the present invention, the rotational shafts 24 and 34 may be arranged to be coaxial with one another, so that the disk sections 22 and 24 may be overlapped with each other in a vertical direction.

Figure 3:
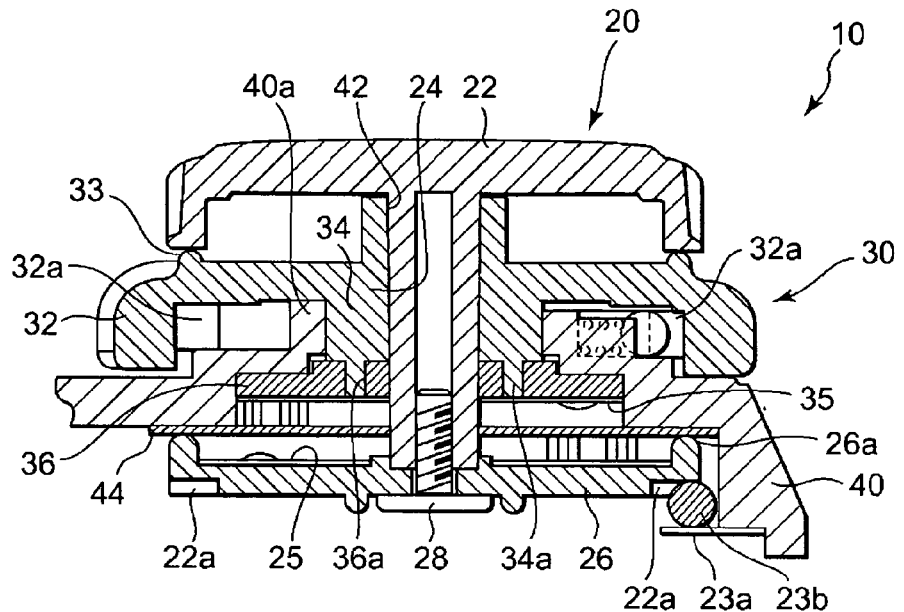
FIG. 3 is a longitudinal cross-sectional view, in part cutaway, of a second embodiment of the present invention, and corresponds to FIG. 2.

FIG. 3 is a longitudinal cross-sectional view, in part cut-away, of a constitution in which the mode dial 20 and the shift dial 30 having an outer diameter larger than that of the mode dial 20 are arranged to be coaxial and relatively displaced in the vertical direction (in an axial direction). It is to be noted that the same reference numerals as those of the first embodiment (FIGS. 1 and 2) designate elements and members which are common to both embodiments.

As shown in FIG. 3, the disk section 22 of the mode dial 20 is arranged over the disk section 32 of the shift dial 30, and the rotational shaft 24 of the mode dial 20 is rotatably fit in the shaft receipt hole 42 of the rotational shaft 34 and in the contact stage 36 of the shift dial 30. The contact stage 26 of the mode dial 20 has a ring-like protrusion 26a protruding upwardly on the peripheral. Since the rotational shaft 24 and the contact stage 26 of the mode dial 20 are fit together and secured by the screw 28, a pulling of the mode dial 20 out of or a movement thereof against the upper covering 40 in the axial direction can be prevented.

In the contact stage 36 of the shift dial 30, the electrical contact 35 integral with the contact stage 36 is positioned above the flexible printed circuit board 44. Similarly, in the contact stage 26 of the mode dial 20, the electrical contact 25 integral with the contact stage 26 is positioned under the flexible printed circuit board 44. As is explained above, since the electrical contact 35 for the shift dial 30 and the electrical contact 25 for the mode dial 20 are arranged above and under the flexible printed circuit board 44, the flexible printed circuit board 44 is shared, and accordingly, it is possible to achieve space-saving in the axial direction.

Pins 34a are extended in the axial direction from the rotational shaft 34 of the shift dial 30, and are fit in holes 36a provided in the contact stage 36. Thus, the contact stage 36 of the shift dial 30 can be integrally rotated with the rotational shaft 34. Meanwhile, the rotational shaft 34 of the shift dial 30 is rotatably fit in a shaft receipt hole 40a of the upper covering 40.

Incidentally, in contrast to the first embodiment, the click holes 22a of the mode dial 20 are not formed on the backside of the disk section 22, but on the backside of the contact stage 26. A steel ball 23b is pressed against the click holes 22a with an elastic force exerted by the flat spring 23a fixedly secured to the upper covering 40. The upper covering 40 (fixing member) is sandwiched by the shift dial 30 and the contact stage 36. Further, the shift dial 30 and the contact stage 36 are sandwiched by the mode dial 20 and the contact stage 26. Furthermore, the flexible printed circuit board 44 is arranged to be sandwiched by the two contact stages 26 and 36. Therefore, the mode dial 20 and the shift dial 30 can be independently rotated.

Thus, according to the present second embodiment, the rotational shafts 24 and 34 of the mode dial 20 (the first rotating-operation member) and the shift dial 30 (the second rotating-operation member) are arranged to be coaxial, and the disk sections 22 and 24 thereof are arranged to be vertically overlapped. Due to this arrangement, a space-saving is achieved in a horizontal direction and accordingly, it is possible to achieve a reduction in the size of the first and second rotating-operation members. Moreover, the electrical contact 25 of the mode dial 20 and the electrical contact 35 of the shift dial 30 are in commonly contact with the flexible board 44 from the bottom and the top. This fact also contributes to the space-saving.

Figure 4:
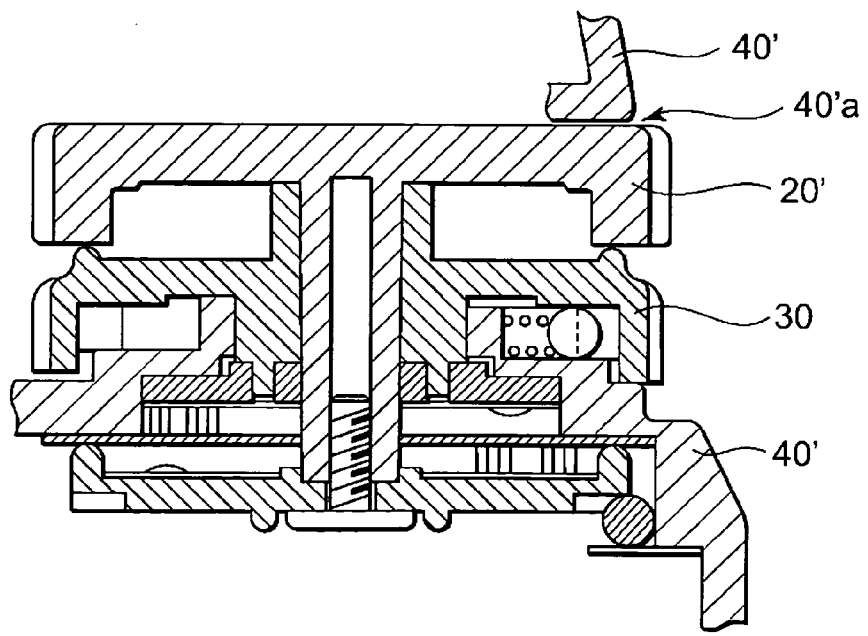
FIG. 4 is a cross-sectional view of a rotating-operation member according to a third embodiment of the present invention.

A third embodiment (FIG. 4) has substantially the same constitution of a mechanism as that of the mechanism of the second embodiment. A difference therebetween resides in that a mode dial 20' of the present third embodiment is larger than the mode dial 20 of the second embodiment in a diameter of the external configuration (a diametrical value of the outer diameter). More concretely, according to the third embodiment, the mode dial 20 has a diameter substantially equal to that of the shift dial 30.

Portions of the mode dial 20' and the shift dial 30 which are two dials arranged in the interior of the apparatus are exposed to the exterior through an aperture 40'$a$ provided in an upper covering 40', which is a part for forming an external configuration of the apparatus. Of course, the sizes of the outer diameters of these dials should be determined depending on the specification of a product which varies from time to time, and if an occasion needs, the diameter of the external configuration of the mode dial 20' may become larger than the outer diameter of the shift dial 30. On the contrary, the outer diameter of the shift dial 30 may be smaller than that of the mode dial 20' as required.

According to the present third embodiment, since the two dials are disposed to be concentrated at a single location of the apparatus, operability of the apparatus can be improved with certainty.

Figure 5:
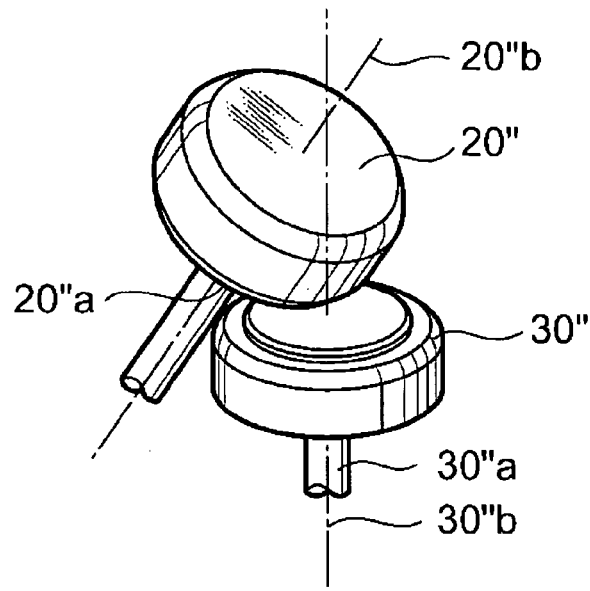
FIG. 5 is an outline view of rotating-operation members according to a fourth embodiment of the present invention.
Figure 6:
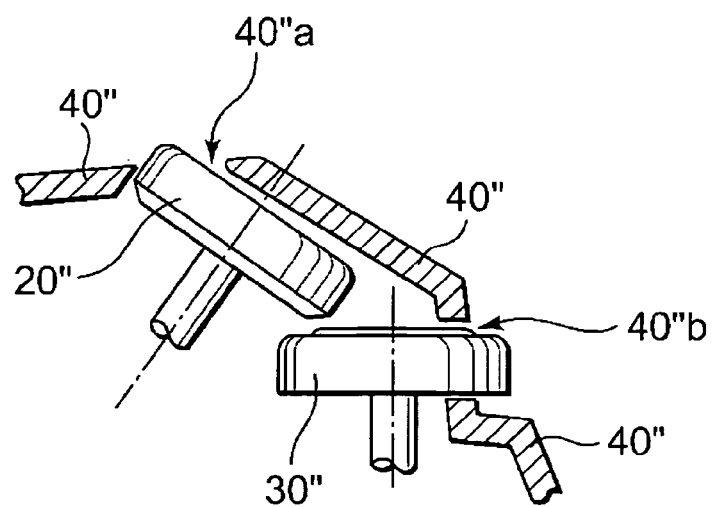
FIG. 6 is a partial view showing the rotating-operation members according to the fourth embodiment of the present invention and illustrating a physical relationship between the two rotating-operation members.

According to a fourth embodiment of the present invention (FIG. 5, FIG. 6), shafts of two dials are arranged in a state where they are twisted. In other words, rotational shafts 20"$a$ and 30"$a$ of both of a mode dial 20" and a shift dial 30" are kept to be not in parallel to each other, so that an extended line 20"$b$ of the rotational shaft 20"$a$ of the mode dial 20" and an extended line 30"$b$ of the rotational shaft 30"$a$ of the shift dial 30", do not intersect with one another. In addition, the disk section of mode dial 20" is partially superposed on the disk section of shift dial 30".

In a practical application, a part of the mode dial 20" arranged within the apparatus is exposed to the exterior through an aperture 40"$a$, which is provided in an upper covering 40" that is an external configuration forming member, and a part of the shift dial 30" arranged within the apparatus is exposed to the exterior through an aperture 40"$b$, which is also provided in the upper covering 40", i.e., the external configuration forming member. In this case, in a manner similar to the first embodiment, an internal mechanism may be constituted such that an electrical contact is moved in association with respective dials, and a circuit board is suitably arranged so as to correspond to this electrical contact.

The geometric extended lines 20"$b$ and 30"$b$ of the respective rotational shafts in the fourth embodiment may be intersected or may not be intersected depending on the necessity in the specification of the apparatus at that time.

According to the present fourth embodiment, the positions of the two dials may improve a degree of freedom on the view point of an external design as well as a mechanical design of the electronic apparatus.

It should be understood that the above-described respective embodiments of the present invention are only for explanation purpose of the present invention, and is not intended to be limited only to these embodiments. Thus, various modifications and applications other than those described above will occur to a person skilled in the art without departing from the scope of the present invention.

For example, the number of the rotating-operation members which are arranged to be horizontally or vertically displaced is not limited to two, but three or more rotating-operation members may be arranged to be appropriately displaced.

According to the present invention, the rotating-operation members are arranged so as to achieve space-saving and accordingly, it is possible to achieve a reduction in the overall size of the rotating-operation members.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An image pick-up device comprising:
   a first rotating-operation member having a disk section which is directly, manually and rotationally operated, the first rotating-operation member having a first rotating shaft; and
   a second rotating-operation member having a disk section which is directly, manually and rotationally operated and provided under the disk section of the first rotating-operation member, the second rotating-operation member having a second rotating shaft which is parallel and non-coaxial to the first rotating shaft,
   wherein the disk section of said first rotating-operation member and the disk section of said second rotating-operation member are partially overlapped with one another.

2. An electronic apparatus comprising:
   a first rotating-operation member having a disk section which is manually rotationally operated; and
   a second rotating-operation member having a disk section which is manually rotationally operated,
   wherein the disk section of said first rotating-operation member and the disk section of said second rotating-operation member are at least partially overlapped with one another, and
   wherein an axis of rotation of said first rotating-operation member is skewed relative to an axis of rotation of said second rotating-operation member.

3. An electronic apparatus comprising:
   a first rotating-operation member having a disk section which is manually rotationally operated; and
   a second rotating-operation member having a disk section which is manually rotationally operated,
   wherein the disk section of said first rotating-operation member and the disk section of said second rotating-operation member are at least partially overlapped with one another, and wherein an extended line of an axis of rotation of said first rotating-operation member and an extended line of an axis of rotation of said second rotating-operation member are mutually intersected.

4. An electronic apparatus comprising:

a first rotating-operation member having a disk section which is manually rotationally operated; and a second rotating-operation member having a disk section which is manually rotationally operated, wherein an axis of rotation of said second rotating-operation member is coaxial with that of said first rotating-operation member, and wherein the disk section of said first rotating-operation member and the disk section of said second rotating-operation member are overlapped one above the other, and an outer diameter of the upper one of said disk sections is larger than that of the lower one of the disk sections.

5. An electronic apparatus comprising:

a first rotating-operation member having a disk section which is manually rotationally operated; and a second rotating-operation member having a disk section which is manually rotationally operated, wherein the disk section of said first rotating-operation member and the disk section of said second rotating-operation member are at least partially overlapped with one another, wherein an axis of rotation of said second rotating-operation member is coaxial with that of said first rotating-operation member, and wherein an outer diameter of the disk section of said first rotating-operation member is identical with that of the disk section of said second rotating-operation member.

6. A rotating-operation member for use in an electronic apparatus, comprising:

a first dial rotationally operated by an operator;

a first rotational shaft extended from a center of the first dial;

a second dial operated by the operator, the second dial being arranged under the first dial, a portion of a peripheral section of said second dial being overlapped with the first dial; and a second rotational shaft, the second rotational shaft being extended from a center of the second dial, and inclined relative to said first rotational shaft.

* * * * *